March 31, 1942.                T. I. DUFFY                    2,277,748
                      CRANK MECHANISM FOR BICYCLES
                           Filed Jan. 2, 1941
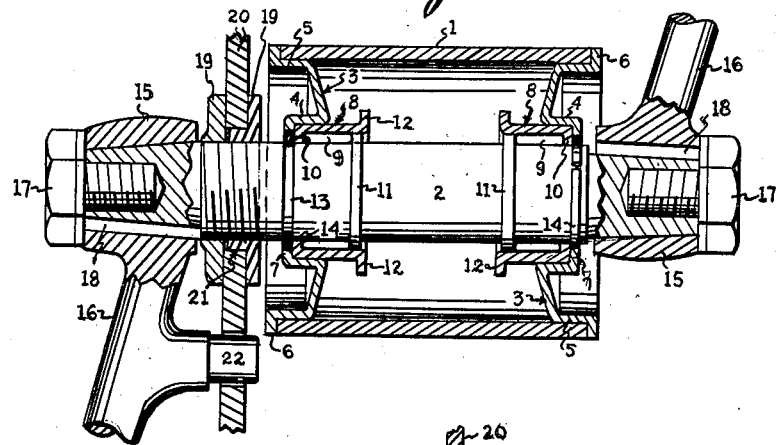
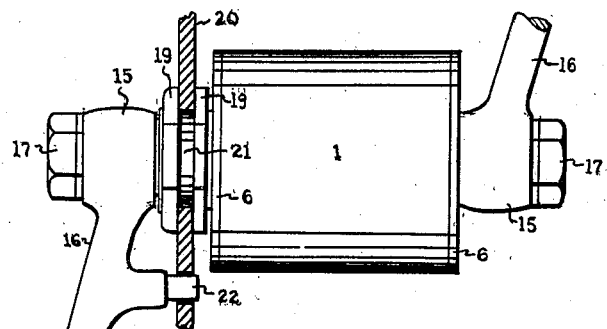
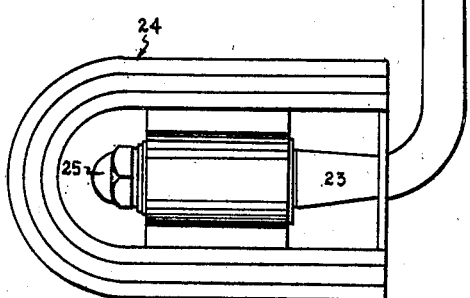
Inventor
Thomas I. Duffy Patented Mar. 31, 1942

2,277,748

UNITED STATES PATENT OFFICE 2,277,748

CRANK MECHANISM FOR BICYCLES

Thomas I. Duffy, Detroit, Mich., assignor to Delray Manufacturing Company, Detroit, Mich., a corporation of Michigan Application January 2, 1941, Serial No. 372,732

4 Claims. (Cl. 308—179.5)

This invention relates to bicycle crank mechanisms and particularly to mountings for bicycle crank shafts.

An object of the invention is to adapt the crank arms of a bicycle to be rigidly attached to the corresponding crank shaft, and to integrally form said arms with pins for journaling the pedals.

Another object is to provide two sets of anti-friction elements for journaling the crank shaft of a bicycle, and to assemble such elements in cups pressed into annular adapters closing the ends of the hanger bracket or barrel, which mounts the crank shaft.

A further object is to form the crank shaft with shoulders for resisting movement of the sets of anti-friction elements toward one another and to form the cups at their outer ends with interior annular flanges for resisting movement from each other of the two sets of elements.

A further object is to provide in a simple manner for holding said cups and anti-friction elements in proper position on the crank-shaft preliminary to assembly of the latter in the hanger bracket.

These and various other objects the invention attains by the construction hereinafter described and illustrated in the accompanying drawing, wherein:

Fig. 1 is an axial sectional view of the crank hanger bracket of a bicycle frame, in its improved relation to a crank shaft.

Fig. 2 is a view showing the relation of a crank arm and pedal to the crank shaft and hanger bracket.

In these views, the reference character 1 designates the usual cylindrical crank hanger bracket formed integrally with a bicycle frame and receiving and mounting a crank shaft 2. Pressed into the ends of said bracket are a pair of annular adapters 3, preferably sheet metal stampings. Said adapters form outwardly opening annular channels, having inner and outer cylindrical walls 4 and 5. The outer walls are formed with outwardly projecting annular flanges 6, which abut the ends of the bracket 1 to establish the proper spaced relation of the two adapters. The inner walls are formed with inwardly projecting annular flanges 7 which form seats for roller-bearing cups 8 press-fitted into the walls 4, and established in proper spaced relation by said flanges 7. Each cup 8 receives a set of rollers 9 journaling the shaft 2, and the relatively remote ends of the cups are formed with interior annular flanges 10 to position the rollers endwise. Within the relatively adjacent ends of the cups are located annular ribs 11 integrally formed upon the shaft, and further positioning the rollers endwise. The last-mentioned ends of the cups are preferably reinforced by forming them with exterior annular flanges 12. The cups and rollers are adapted to be held properly positioned on the shaft 2, prior to mounting the latter in the bracket 1, by forming the shaft with annular grooves 13, receiving split wire snap rings 14, engageable with the flanges 10 to hold the cups in place prior to engagement of the cups by the adapters.

The end portions of the shaft 2 project beyond the bracket 1 and are tapered to snugly fit correspondingly shaped bores in heads 15 formed on the inner ends of crank arms 16. Bolts 17 tapped into the shaft extremities are headed to clamp the arms firmly on the shaft, and keys 18 preferably interengage the shaft and said heads to positively prohibit relative rotation. Threaded upon the shaft between one of said tapered ends and the bracket 1 is a pair of lock nuts 19 between which is clamped a sprocket wheel 20, and one of said nuts is formed with a hub 21 closely fitting within a central opening of the wheel 20 to assure accurate centering of the latter. A pin 22 integrally formed on the crank arm adjacent to the wheel 20 is inserted in the latter to assure a positive drive from the shaft to the wheel.

Formed integrally with the outer ends of the crank arms are pedal pins 23, whereon any suitable pedals 24 are rotatively retained by cap nuts 25.

The described manner of mounting the crank shaft permits of a quick assembly and assures an accurate location of the shaft at the axis of the hanger bracket 1. In assembling, it is preferred to first install the bearing cups with their rollers on the shaft, holding said cups in place by the snap rings 14. The adapter ring is pressed upon the bearing cup toward the sprocket end portion of the shaft, and said ring is pressed into the bracket 1. The sprocket wheel is now clamped by the nuts 19 in proper position on the shaft and the other adapter ring is pressed into place and finally the crank arms are applied and clamped in place by the bolts 17.

Formation of the pins 23 integrally with the crank arms results in a much stronger and lighter construction than results from the common practice of separately forming the pins and threading them into the outer ends of the arms. Assembly is simplified by employing annular ribs on the shaft in conjunction with interior flanges on the cups 8 to restrain the rollers 9 from endwise shifting.

What I claim is:

1. In a bicycle crank mechanism, the combination with the crank shaft and usual cylindrical hanger bracket of a bicycle frame, of a pair of adapter rings press-fitted in the ends of said bracket, a pair of bearing cups press-fitted within said rings and projecting from the rings toward each other and formed with interior flanges at their relatively remote ends, a set of rotatable anti-friction elements assembled in each cup and directly journaling said shaft, and annular ribs integrally carried by the shaft within the relatively adjacent ends of said cups, the anti-friction elements being restrained from endwise movement jointly by said ribs and flanges.

2. In a bicycle crank mechanism, the combination with the crank shaft and usual cylindrical hanger bracket of a bicycle frame, of a pair of adapter rings fixedly inserted in the ends of said bracket, a pair of bearing cups press-fitted in the central openings of said rings, two sets of anti-friction elements assembled in said cups and journaling said shaft, the relatively remote ends of said cups being formed with interior flanges restraining said elements from movement toward the shaft extremities and the shaft being shouldered to restrain said elements from movement toward the shaft center, and a pair of snap rings set into annular grooves of said shaft for holding said cups from movement toward the shaft extremities prior to assembly in said bracket.

3. In a bicycle crank mechanism, the combination with a bicycle crank shaft and the usual cylindrical hanger bracket of a bicycle frame, of a pair of adapter rings fixedly inserted in the ends of said bracket and forming annular channels opening toward the bracket ends, the inner walls of said channels being formed with flanges projecting toward the axis of said bracket, a pair of bearing cups press-fitted within said inner walls and abutting said flanges to determine the maximum spaced relation of said cups, and two sets of rotatable anti-friction elements assembled in said cups and directly journaling said shaft.

4. A bicycle crank mechanism as set forth in claim 3, said cups being flanged toward said axis at their relatively remote ends the shaft being formed with two annular shoulders between and spaced from the cup flanges, and said anti-friction elements being confined between the cup flanges and shoulders.

THOMAS I. DUFFY.